(12) United States Patent
Fulford et al.

(10) Patent No.: US 9,786,071 B2
(45) Date of Patent: Oct. 10, 2017

(54) GEOMETRIC SHAPE HIERARCHY DETERMINATION TO PROVIDE VISUALIZATION CONTEXT

(71) Applicant: International Business Machines Corporation, Armonk, NY (US)

(72) Inventors: Christine K. Fulford, Ottawa (CA); Robert Y. Nonez, Ottawa (CA); Claudiu D. Popescu, Ottawa (CA); Mohsen Rais-Ghasem, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/667,723

(22) Filed: Mar. 25, 2015

(65) Prior Publication Data

US 2016/0284110 A1   Sep. 29, 2016

(51) Int. Cl.
| | |
|---|---|
| *G06T 11/20* | (2006.01) |
| *G06T 11/60* | (2006.01) |
| *G06T 17/05* | (2011.01) |
| *G06T 15/30* | (2011.01) |
| *G06T 3/40* | (2006.01) |

(52) U.S. Cl.
CPC .......... *G06T 11/206* (2013.01); *G06T 11/60* (2013.01); *G06T 17/05* (2013.01); *G06T 2200/32* (2013.01); *G06T 2210/12* (2013.01)

(58) Field of Classification Search
CPC ........ G06T 11/00; G06T 11/20; G06T 11/203; G06T 11/206; G06T 15/30; G06T 15/40; G06T 17/00; G06T 17/005; G06T 17/10; G06T 19/00; G06T 19/003; G06T 2210/12; G06F 3/0482; G06F 17/30961; G06F 17/30994

USPC ......... 345/420, 440, 441, 622; 715/853, 854
See application file for complete search history.

(56) References Cited

U.S. PATENT DOCUMENTS

| | | | | |
|---|---|---|---|---|
| 6,154,215 A | * | 11/2000 | Hopcroft | G06T 11/206 345/418 |
| 6,411,297 B1 | * | 6/2002 | Tampieri | G06T 15/55 345/426 |
| 6,529,905 B1 | * | 3/2003 | Bray | G06F 9/526 |
| 7,436,406 B2 | * | 10/2008 | Dautelle | G06F 3/0481 342/176 |

(Continued)

FOREIGN PATENT DOCUMENTS

WO       2012030902 A1    3/2012

OTHER PUBLICATIONS

Reddy, Martin, et al. "TerraVision II: Visualizing massive terrain databases in VRML." IEEE Computer graphics and Applications 19.2 (Mar. 1999): 30-38.*

(Continued)

*Primary Examiner* — Ulka Chauhan
*Assistant Examiner* — Sae Won Yoon
(74) *Attorney, Agent, or Firm* — Adolph C. Bohnstedt (57) ABSTRACT

One or more processors sort a plurality of geometric shapes using one or more size criteria. One or more processors determine whether the plurality of geometric shapes include at least one geometric shape that encapsulates or partially overlaps at least one other geometric shape. One or more processors assign a hierarchical order for the plurality of geometric shapes based, at least in part, on the one or more size criteria and one or more criteria of one or both encapsulation and partial overlap.

10 Claims, 8 Drawing Sheets

(56) References Cited

U.S. PATENT DOCUMENTS

| | | | |
|---|---|---|---|
| 7,703,045 B1* | 4/2010 | Kawahara | G06F 3/0486 715/769 |
| 8,660,793 B2 | 2/2014 | Ngo et al. | |
| 8,698,809 B2* | 4/2014 | Hamedi | G06T 17/005 345/473 |
| 9,286,712 B2 | 3/2016 | Kontkanen | |
| 2003/0065668 A1* | 4/2003 | Sowizral | G06T 15/20 |
| 2003/0187867 A1* | 10/2003 | Smartt | G06F 17/30241 |
| 2003/0197722 A1 | 10/2003 | Sugauchi et al. | |
| 2004/0239701 A1* | 12/2004 | Crichton | G06F 3/1454 715/853 |
| 2005/0035883 A1* | 2/2005 | Kameda | G01C 21/3638 340/995.1 |
| 2006/0125836 A1* | 6/2006 | Lojou | G01W 1/16 345/581 |
| 2006/0253245 A1* | 11/2006 | Cera | G06F 3/04815 701/117 |
| 2007/0273696 A1 | 11/2007 | Cheng et al. | |
| 2008/0010605 A1 | 1/2008 | Frank | |
| 2009/0073167 A1* | 3/2009 | Brown | G06T 15/06 345/421 |
| 2009/0324132 A1* | 12/2009 | Joy | G06K 9/481 382/282 |
| 2010/0095231 A1 | 4/2010 | Marlow | |
| 2010/0225644 A1* | 9/2010 | Swope, III | G06T 13/00 345/419 |
| 2010/0321391 A1 | 12/2010 | Rubin et al. | |
| 2011/0122153 A1* | 5/2011 | Okamura | G01C 21/00 345/629 |
| 2011/0219009 A1 | 9/2011 | Rosenfeld et al. | |
| 2013/0063489 A1* | 3/2013 | Hourie | G06F 17/30241 345/643 |
| 2013/0271488 A1* | 10/2013 | Stirbu | G09G 5/14 345/619 |
| 2014/0200863 A1* | 7/2014 | Kamat | G01C 15/00 703/1 |
| 2014/0325477 A1* | 10/2014 | Hawes | G06F 8/70 717/120 |
| 2014/0354650 A1* | 12/2014 | Singh | G06T 11/206 345/440 |
| 2015/0036874 A1 | 2/2015 | Gueguen | |
| 2015/0242106 A1* | 8/2015 | Penha | G06F 3/04847 715/854 |

OTHER PUBLICATIONS

Coors, Volker, and Volker Jung. "Using VRML as an Interface to the 3D Data Warehouse." Proceedings of the third symposium on Virtual reality modeling language. ACM, 1998.*

U.S. Appl. No. 15/077,951, entitled "Geometric Shape Hierarchy Determination to Provide Visualization Context", filed Mar. 23, 2016.

Appendix P, List of IBM Patents or Patent Applications Treated As Related.

Chaudhuri et al., "A simple method for fitting of bounding rectangle to closed regions", © 2007 Published by Elsevier Ltd on behalf of Pattern Recognition Society, Pattern Recognition 40 (2007) 1981-1989, doi:10.1016/j.patcog.2006.08.003.

* cited by examiner

GEOMETRIC SHAPE HIERARCHY DETERMINATION TO PROVIDE VISUALIZATION CONTEXT

BACKGROUND OF THE INVENTION

The present invention relates generally to the fields of hierarchy determination, and more particularly to the determination of geometric shape hierarchy.

A bounding region algorithm is often used to generate, for example, geographical maps. In this context, a bounding region algorithm returns a map that provides the desired geographical areas at a maximum possible zoom. For example, if a user requests a map showing two or more geographical areas, e.g. states or provinces, a bounding region algorithm will generate a map with borders that include just enough area to view the requested areas.

SUMMARY

Embodiments of the present invention provide a method, system, and program product to determine geometric shape hierarchy. One or more processors sort a plurality of geometric shapes using one or more size criteria. One or more processors determine whether the plurality of geometric shapes include at least one geometric shape that encapsulates or partially overlaps at least one other geometric shape. One or more processors assign a hierarchical order for the plurality of geometric shapes based, at least in part, on the one or more size criteria and one or more criteria of one or both encapsulation and partial overlap.

DETAILED DESCRIPTION

In some instances, a close view of geometric shapes results in a loss of context. For example, in one scenario, a map of states or provinces within a country is less helpful to a viewer because the map does not also include the country in its entirety for better comprehension of the state or province locations. In a non-geographical example and scenario, a drawing showing how to assemble furniture is difficult to decipher because the visualization does not include the context given by seeing the parent structure.

The examples above involve visualizing geometric shapes without seeing the lowest common ancestor (LCA) of the geometric shapes. In graph theory and computer science, the LCA of two nodes in a tree or directed acyclic graph (DAG) is the lowest (i.e. deepest) node that has both nodes as descendants. Typically, each node is considered to be a descendant of itself. For example, a country is a LCA of a selection of states or provinces within that country. However, if the selection of geographical areas do not all reside in one country, but instead reside in different countries within a single continent, then the LCA would be that continent. If the selection of geographical areas do not all reside in one continent, then the LCA may be a hemisphere or perhaps the world itself. It is often informative to see the LCA with any set of geometric objects in order to gain context.

Determining an LCA requires the existence of a hierarchical order. For example, a hierarchical order for geography is (from descendant to ancestor): city, county, state, country, continent, hemisphere, and world. In this example, cities are children to counties and counties are children to states, etc. Conversely, counties are parents to cities and states are parents to counties. Furthermore, cities are grandchildren of states and states are grandparents of cities. For geometric shapes such as geographical areas, ancestors typically are larger in size and encapsulate or at least partially overlap their descendants. Thus, a hierarchy logically follows any map of encapsulating or partially overlapping geometric shapes if the sizes (area or volume) are known. This is true regardless of whether the geometric shapes are two-dimensional or three-dimensional.

Embodiments of the present invention recognize that computer generated maps of geometric shapes, such as geographical maps, use a bounding region algorithm. Embodiments of the present invention provide a method, system, and program product that generate maps of geometric shapes by determining the hierarchy of the shapes and providing a map that shows the selected shapes along with their LCA for context. Thus, by analogy to the example above, one embodiment of the present invention determines whether the LCA shape for any selection of U.S. state shapes is the shape of the U.S. itself. One embodiment of the present invention provides a map of the states wherein their location within the U.S. can be visualized because the map view shows the entire U.S. with the selected states highlighted.

The present invention will now be described in detail with reference to the Figures.

Figure 1:
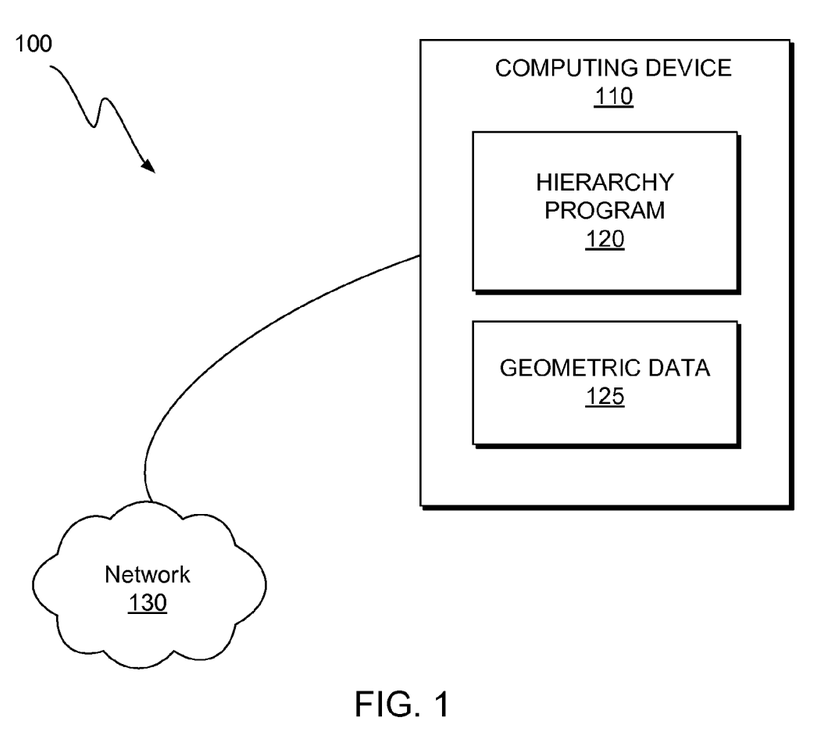
FIG. 1 is a functional block diagram illustrating a geometric hierarchy determination and visualization environment, in accordance with an exemplary embodiment of the present invention.

FIG. 1 is a functional block diagram illustrating a geometric hierarchy determination and visualization environment, generally designated 100, in accordance with one embodiment of the present invention. Geometric hierarchy determination and visualization environment 100 includes computing device 110 connected over network 130. Computing device 110 includes hierarchy program 120 and geometric data 125.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to geometric data 125 and is capable of executing hierarchy program 120. Computing device 110 may include internal and external hardware components, as depicted and described in further detail with respect to FIG. 9.

In this exemplary embodiment, hierarchy program 120 and geometric data 125 are stored on computing device 110. However, in other embodiments, hierarchy program 120 and geometric data 125 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between hierarchy program 120 and geometric data 125, in accordance with a desired embodiment of the present invention.

In one exemplary embodiment, hierarchy program 120 determines the hierarchy of a map of geometric shapes according to the sizes of the shapes and whether they are encapsulated by or partially overlap with other shapes. Hierarchy program 120 generates a hierarchy tree of the shapes for use in generating maps, wherein the map borders include the LCA of any selected shapes.

In one exemplary embodiment, geometric data 125 includes at least one file containing the coordinates of various geometric shapes. In one embodiment, the geometric shape data contained within geometric data 125 is geographical data. For example, map data for any and all towns, cities, counties, provinces, states, countries, continents, and other geographical shapes is contained within geometric data 125. Geometric data 125 is not restricted to land maps. For example, geometric data 125 in some embodiments includes geographical data for any and all bodies of water such as rivers, ponds, lakes, seas, oceans, etc. Geometric data 125 is not restricted to maps of Earth. For example, geometric data 125 in some embodiments includes geographical information of celestial bodies such as distant planets, moons, etc. Geometric data 125 is not limited to geographical shapes. In fact, geometric data 125 is any file that contains the coordinates of two-dimensional or three-dimensional geometric shapes real or imagined, natural or unnatural, microscopic or macroscopic, etc.

Figure 2:
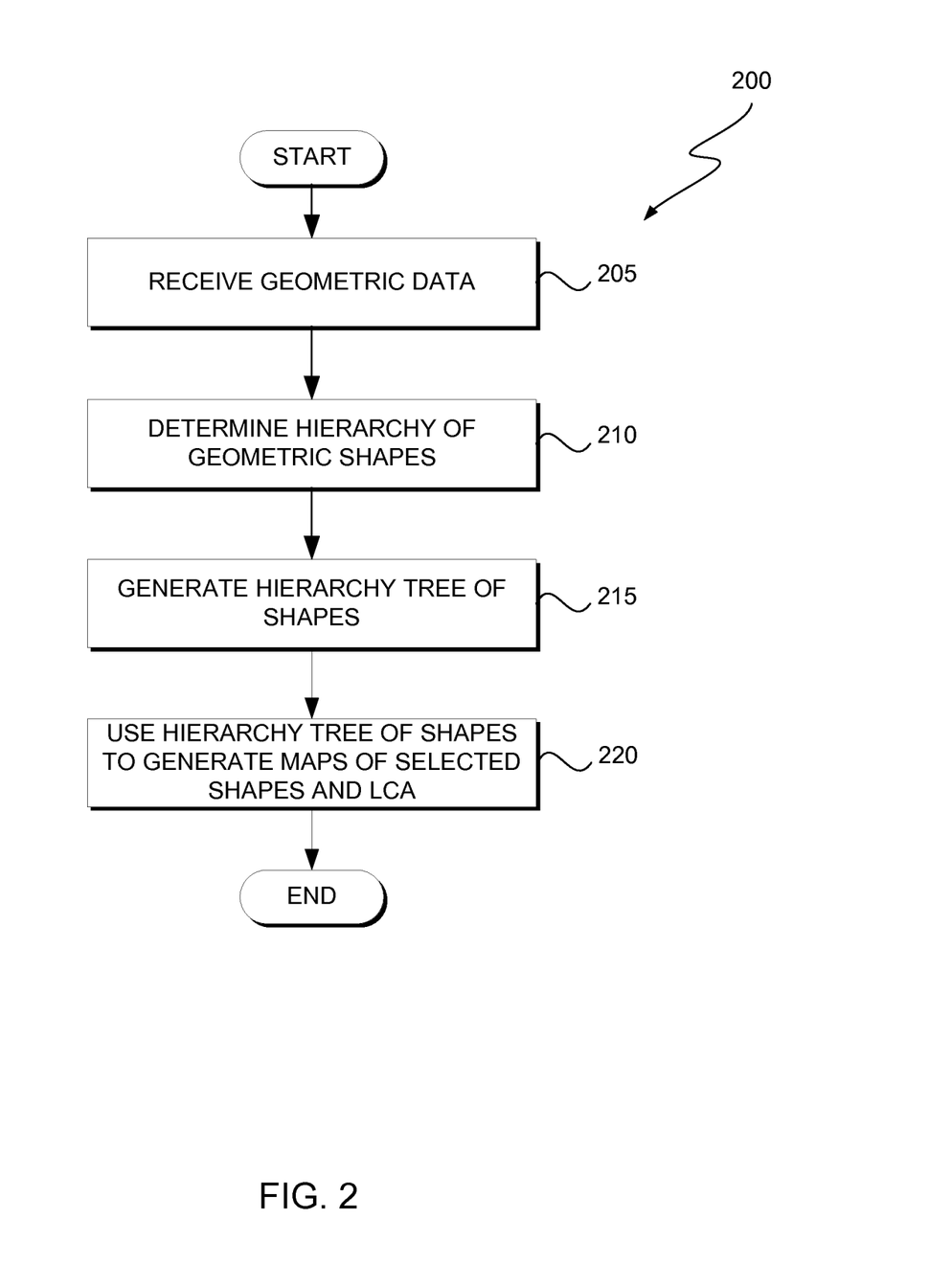
FIG. 2 illustrates operational processes of a hierarchy program, on a computing device within the environment of FIG. 1, in accordance with an exemplary embodiment of the present invention.

FIG. 2 illustrates operational processes, 200, of hierarchy program 120, executing on computing device 110 within the environment of FIG. 1, in accordance with an exemplary embodiment of the present invention.

In step 205, hierarchy program 120 receives geometric data 125, which includes at least one file containing the coordinates of a plurality of geometric shapes.

In step 210, hierarchy program 120 determines the hierarchy of the geometric shapes within geometric data 125. The hierarchy of the geometric shapes within geometric data 125 is based on the area or volume within the geometric shapes and on encapsulation or partial overlap of any one geometric shape by another geometric shape. In exemplary embodiments, encapsulation or partial overlap of any one geometric shape by another geometric shape is indicative of a parent-child relationship between those geometric shapes. The area or volume of the geometric shapes indicates which shape is the parent shape and which shape is the child shape. In one example, a first two-dimensional geometric shape is encapsulated by a second larger two-dimensional geometric shape. Because the second shape is larger in area and because it encapsulates the first shape, the second two-dimensional geometric shape is determined to be a parent shape of the first two-dimensional geometric shape by hierarchy program 120. In a second example, a first three-dimensional geometric shape partially overlaps a second smaller volume three-dimensional geometric shape. Because the second shape is smaller in volume and partially overlaps the larger first shape, the second three-dimensional geometric shape is determined to be a child shape of the first three-dimensional geometric shape.

In step 215, hierarchy program 120 generates a hierarchy tree that describes the hierarchy of the geometric shapes. In various embodiments, the hierarchy tree generated by hierarchy program 120 is a directed graph where the shape labels are nodes or vertices and the parent/child relationship is indicated by an edge connecting the nodes or vertices. For example, a parent/child relationship between two geometric shapes is indicated by two nodes or vertices connected by an edge, wherein the directionality of the relationship is indicated by representing the edge as an arrow. In one embodiment, the directional indicator or arrow points from the parent node to the child node. In another embodiment, the directional indicator or arrow points from the child node to the parent node.

In various embodiments, the hierarchy tree generated by hierarchy program 120 is an undirected graph where the shape labels are nodes or vertices and the parent/child relationship is indicated by an edge connecting the nodes or vertices. In these embodiments, the edges show no directionality. However, the parent/child relationship is expressed by other features of the graph such as node size or node placement. For example, for any two nodes connected by an undirected edge (e.g. a simple line), the parent node will be represented as larger than the child node. In another example, the parent node is smaller than the child node. The position of the nodes are indicative of the parent/child relationship in other embodiments. For example, a parent node connected to a child node in an undirected graph is represented as the node that is higher than the child node. In another example, the parent node is represented as a node that is lower than the child node.

The hierarchy trees capable of being generated by hierarchy program 120 are not to be limited by the above embodiments and examples. One skilled in the art would recognize that any one of or a combination of directed, undirected, and even mixed graphs (directed and undirected together) can convey parent/child relationships through other visual effects such as color, brightness, etc. in various embodiments.

In step 220, hierarchy program 120 uses the generated hierarchy tree to generate maps of selected geometric shapes and their LCA geometric shape. For example, two or more geometric shapes from a geometric data file within geometric data 125 are selected for mapping. Hierarchy program 120 determines the LCA node by tracing the edges from the nodes that represent the selected geometric shapes to their parents, grandparents, etc. until the LCA node between the selected nodes is identified. Hierarchy program 120 then produces a map that includes the selected geometric shapes and the geometric shape that the LCA node represents, i.e. the LCA geometric shape. In exemplary embodiments, the map draws the selected geometric shapes and the LCA geometric shape in the same relative positions and having the same relative areas or volumes as represented by the geometric data file within geometric data 125. The generated map need not solely include the selected geometric shapes and the LCA geometric shape. In exemplary embodiments, the borders of the generated map will encompass the LCA geometric shape, the selected geometric shapes, and any other shapes that facilitate the selected geometric shape visual context. Any geometric shapes other the selected geometric shapes and their LCA geometric shape can be incorporated into the map representation (or not) based on user preference. In exemplary embodiments, the selected geometric shapes will be highlighted to indicate their selection. For example, the fill color for the selected geometric shapes is different than all of the other geometric shapes included in the generated map. Another possibility includes bolder shape borders surrounding the selected geometric shapes as compared to other geometric shapes included in the generated map.

Figure 3:
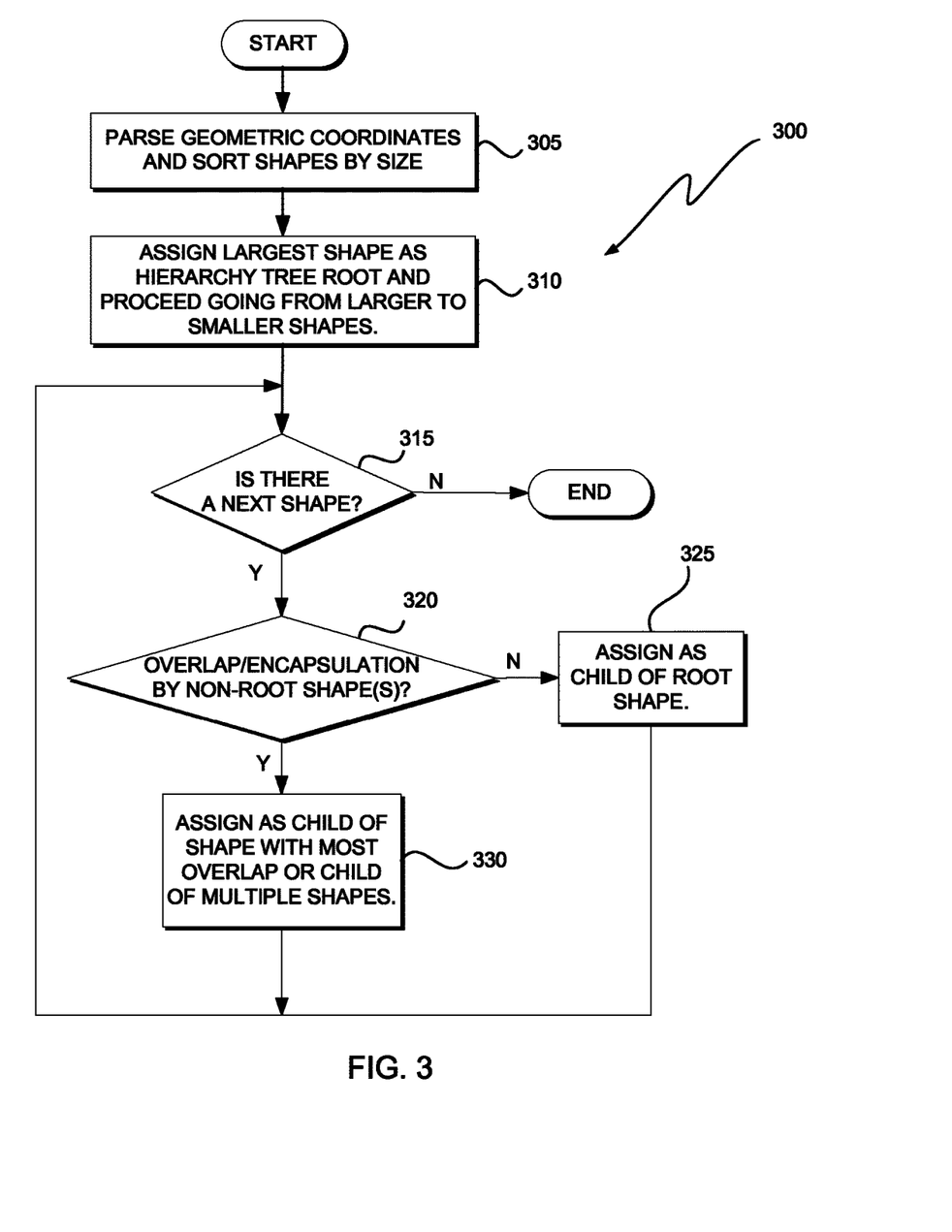
FIG. 3 illustrates operational processes of a hierarchy program when determining the hierarchy of geometric shapes on a computing device within the environment of FIG. 1, in accordance with an exemplary embodiment of the present invention.

FIG. 3 illustrates operational processes, 300, of hierarchy program 120 when determining the hierarchy of geometric shapes on computing device 110 within the environment of FIG. 1, in accordance with an exemplary embodiment of the present invention. In step 305, hierarchy program 120 parses the geometric coordinates that define the geometric shapes with geometric data 125. Next, hierarchy program 120 sorts all of the shapes by their size, which is either area or volume depending on whether the geometric shapes are two-dimensional or three-dimensional.

In step 310, hierarchy program 120 assigns the largest sized geometric shape as the hierarchy tree root shape. In various embodiments, the largest sized geometric shape encapsulates all of the smaller geometric shapes. In other embodiments, the largest sized geometric shape does not encapsulate all of the smaller geometric shapes. In the latter embodiments, hierarchy program 120 either assigns the largest shape as the hierarchy tree root shape or creates a geometric shape that encapsulates all of the geometric shapes and assigns the created geometric shape as the hierarchy tree root shape. After the hierarchy tree root shape has been assigned by hierarchy program 120, the program proceeds through the process loop that begins with step 315.

In step 315, hierarchy program 120 determines whether there is a next shape. When all the sorted geometric shapes from steps 305 and 310 have been processed, hierarchy program 120 has completed the hierarchy tree that describes the hierarchy of the geometric shapes included in the geometric data file of interest within geometric data 125. At that point, the process described in FIG. 3 is completed and ends. However, until the last geometric shape from steps 305 and 310 has been processed, the process continues according to steps 320-330 (vide infra).

In step 320, hierarchy program 120 determines whether there is encapsulation or partial overlap of the current geometric shape by an earlier processed geometric shape. If there is no encapsulation or partial overlap of the current geometric shape by an earlier processed, non-hierarchy tree root geometric shape, then the current geometric shape is assigned as a child of the hierarchy tree root shape in step 325. If there is encapsulation of the current geometric shape by an earlier processed, non-hierarchy tree root geometric shape, then the current geometric shape is assigned as a child of the earlier processed, non-hierarchy tree root geometric shape. In various embodiments, hierarchy program 120 does not recognize encapsulation by two shapes. In other words, if the current geometric shape is encapsulated by an earlier geometric shape that is, in turn, encapsulated by yet another earlier geometric shape, the current geometric shape is considered encapsulated only by the later processed (and smaller) geometric shape and assigned as a child geometric shape of that later processed geometric shape in step 330.

If there is partial overlap of the current geometric shape by only one of the earlier processed, non-hierarchy tree root geometric shapes, then the current geometric shape is assigned as the child of that earlier processed, non-hierarchy tree root geometric shape. However, if there is partial overlap of the current geometric shape by more than one earlier processed, non-hierarchy tree root geometric shape, then there are at least two possible embodiments for step 330. In one embodiment, the current geometric shape is assigned as the child of the earlier processed geometric shape that overlaps the most area or volume of the current geometric shape. In another embodiment, the current geometric shape is assigned as the child of all earlier processed geometric shapes upon which it partially overlaps.

Figure 4:
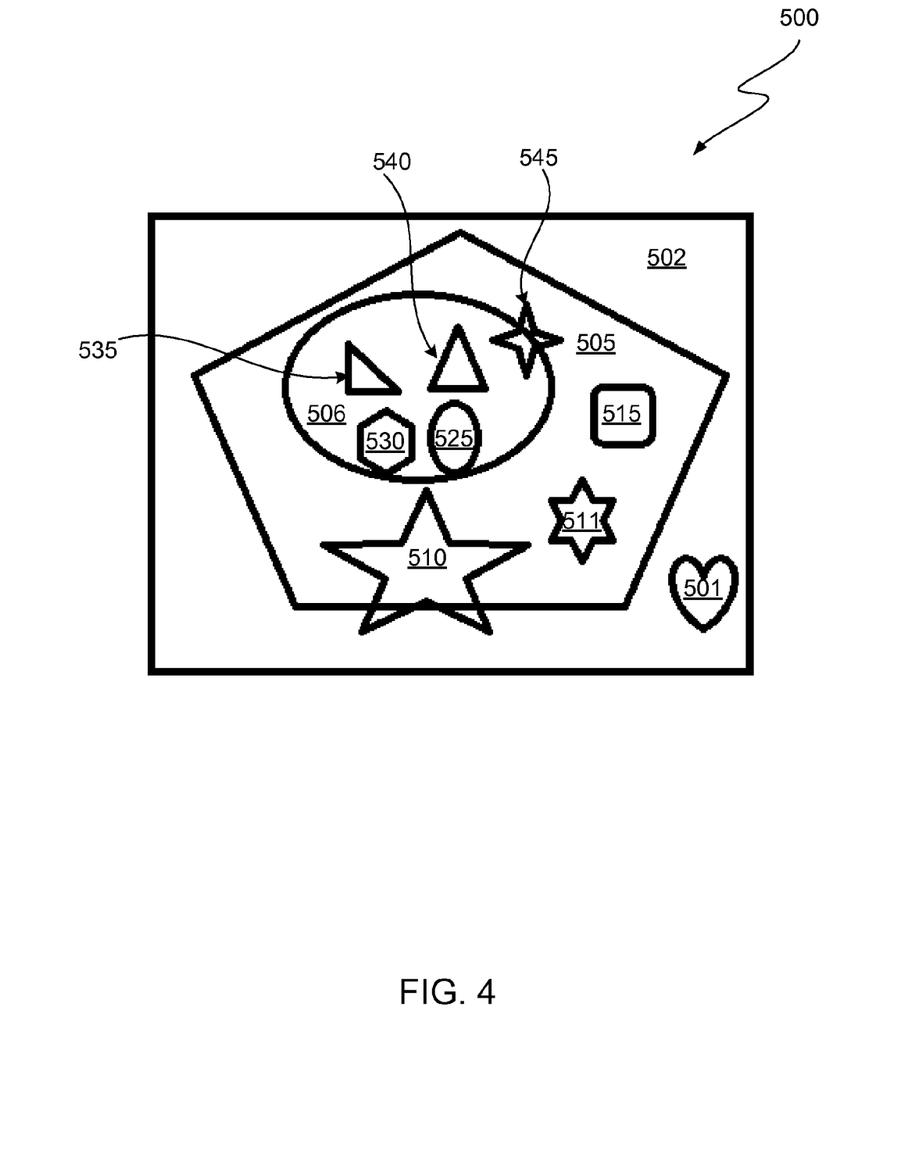
FIG. 4 shows an example of geometric data in the form of a map file of two-dimensional geometric shapes, in accordance with an exemplary embodiment of the present invention.

FIG. 4 shows an example, map 500, of geometric data 125 in the form of a map file of two-dimensional geometric shapes, in accordance with an exemplary embodiment of the present invention. The largest geometric shape in map 500 is geometric shape 502, which encapsulates all other shapes in map 500, hence hierarchy program 120 assigns geometric shape 502 as the hierarchy root shape. The next largest geometric shape in map 500 is geometric shape 505, which is therefore analyzed second by hierarchy program 120. Geometric shape 505 is not encapsulated by any prior non-hierarchy root shape so hierarchy program 120 assigns geometric shape 505 as the child of hierarchy root shape 502. The next largest geometric shape in map 500 is geometric shape 506, which is therefore analyzed third by hierarchy program 120. Geometric shape 506 is encapsulated by a prior non-hierarchy root shape, which is geometric shape 505. Thus, hierarchy program 120 assigns geometric shape 506 as the child of geometric shape 505. The next largest geometric shape in map 500 is geometric shape 510, which is therefore analyzed fourth by hierarchy program 120. Geometric shape 510 partially overlaps a prior non-hierarchy root shape, which is geometric shape 505. Geometric shape 510 also partially overlaps hierarchy root shape 502. Geometric shape 510 has a larger area overlap with geometric shape 505 and a smaller area overlap with hierarchy root shape 502. Depending on the settings of hierarchy program 120, hierarchy program 120 will assign geometric shape 510 as the child of only geometric shape 505 or assign geometric shape 510 as the child of both geometric shape 505 and hierarchy root shape 502.

Geometric shapes 501, 511, 515, 525, 530, 535, 540, and 545 are all encapsulated or partially overlap with geometric shapes discussed above. As a consequence, it is irrelevant in which order these geometric shapes are analyzed by hierarchy program 120 since the resulting hierarchy tree will be the same no matter the order. For the sake of brevity, it is acknowledged that geometric shape 501 is the child of hierarchy root shape 502, geometric shapes 511 and 515 are the children of geometric shape 505, and geometric shapes 525, 530, 535, and 540 are the children of geometric shape 506. Geometric shape 545 partially overlaps geometric shapes 505 and 506 with the most overlap occurring with geometric shape 506. Thus, depending on the settings of hierarchy program 120, hierarchy program 120 will assign geometric shape 545 as the child of only geometric shape 506 or assign geometric shape 545 as the child of both geometric shape 506 and geometric shape 505.

Figure 5A:
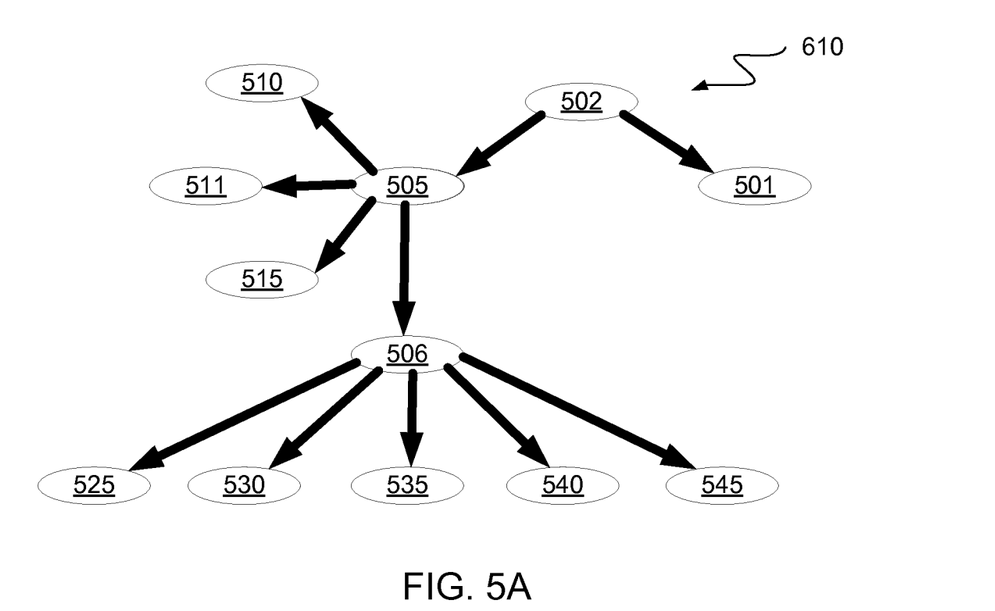
FIG. 5A shows a first example of a hierarchy tree generated by a hierarchy program from the geometric data of FIG. 4, in accordance with an exemplary embodiment of the present invention.

FIG. 5A shows a first example of a hierarchy tree, 610, generated by hierarchy program 120 from the geometric data of FIG. 4, in accordance with an exemplary embodiment of the present invention. In this example, hierarchy program 120 generates hierarchy tree 610 as a directed graph whereby the nodes representing the geometric shapes of FIG. 4 are expressed as numbered ovals and the edges are shown as arrows pointing from parent node to child node. In this example, hierarchy program 120 is set to allow only parent geometric shape for any child geometric shape. In other possible examples and as described earlier, hierarchy program 120 generates a hierarchy tree from the geometric data of FIG. 4 that is expressed as an undirected or even mixed graph. Hierarchy tree 610 shows that node 502 represents the hierarchy root shape 502 since it is the only node with no directed edges pointing towards it. Hierarchy tree 610 shows that node 502 has two child nodes, node 501 and node 505. In this example, hierarchy program 120 is set to allow only parent geometric shape for any child geometric shape. Thus, node 510 and node 502 do not share an edge even though geometric shape 510 partially overlaps with geometric shape 502. The reason is that geometric shape 510 overlaps geometric shape 505 to a greater extent. Since geometric shape 505 overlaps to a greater extent than geometric shape 502 to geometric shape 510, geometric shape 505 is assigned to be the parent of geometric shape 510 under a setting that allows only one parent per child.

Hierarchy tree 610 shows that geometric structure 501 is childless since node 501 has no edges leading away from it. However, hierarchy tree 610 shows that geometric shape 505 has four children geometric shapes, 506, 510, 511, and 515. Note again that no edge connects node 505 to node 545 because geometric shape 545 has a greater overlap with geometric shape 506 than with geometric shape 505. Since geometric shape 506 overlaps to a greater extent than geometric shape 505 to geometric shape 545, geometric shape 506 is assigned to be the parent of geometric shape 545 under a setting that allows only one parent per child. Hierarchy tree 610 shows that geometric structure 510, 511, and 515 are childless since these nodes have no edges leading away from them. However, hierarchy tree 610 shows that geometric shape 506 has five children geometric shapes, 525, 530, 535, 540, and 545, which are all childless.

Figure 5B:
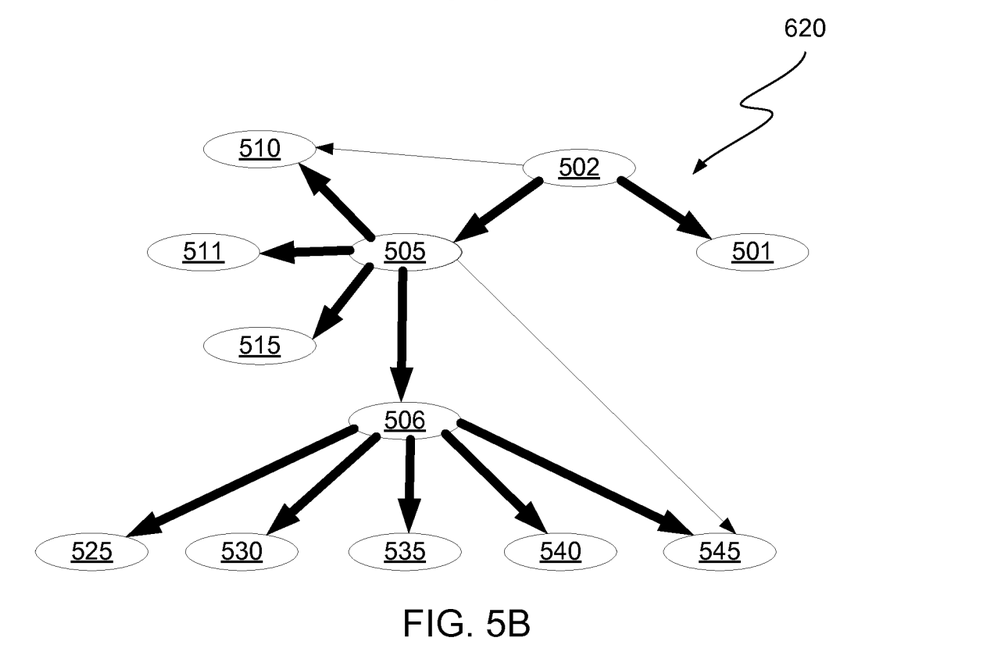
FIG. 5B shows a second example of a hierarchy tree generated by a hierarchy program from the geometric data of FIG. 4, in accordance with an exemplary embodiment of the present invention.

FIG. 5B shows a second example of a hierarchy tree, 620, generated by hierarchy program 120 from the geometric data of FIG. 4, in accordance with an exemplary embodiment of the present invention. In this example, hierarchy program 120 generates hierarchy tree 620 as a directed graph wherein hierarchy program 120 is set to allow more than one parent geometric shape for any child geometric shape. In this example, when a first geometric shape overlaps with two other geometric shapes hierarchy program 120 draws a bolder edge connecting the node pairs that represent the geometric shapes with greater overlap. Thus, since geometric shape 510 overlaps to a greater extent with geometric shape 505 compared to geometric shape 502, the edge between node 505 and node 510 is bolder than the edge between node 502 and node 510. Likewise, since geometric shape 545 overlaps to a greater extent with geometric shape 506 compared to geometric shape 505, the edge between node 506 and node 545 is bolder than the edge between node 505 and node 545.

Figure 6A:
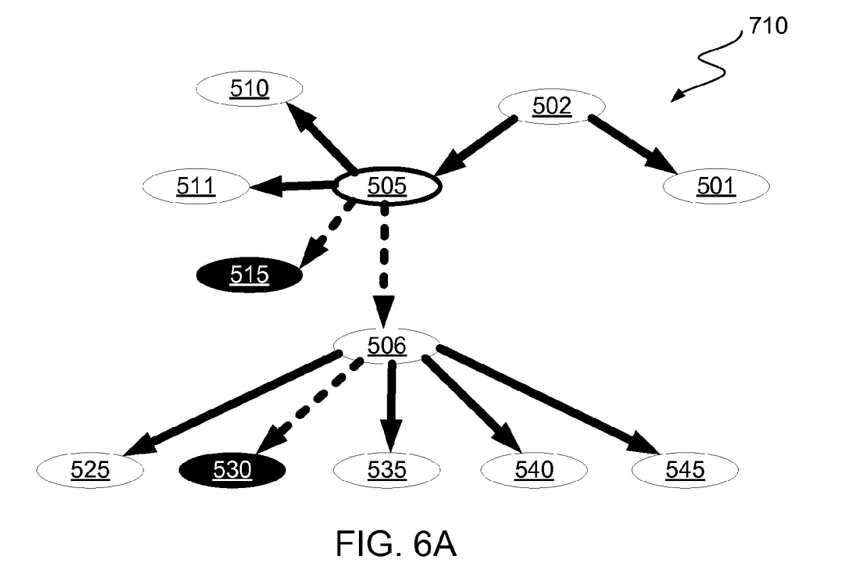
FIG. 6A shows an example of the hierarchy tree of FIG. 5A in which two shapes have been selected in order to generate a map of the shapes and their lowest common ancestor (LCA), in accordance with an exemplary embodiment of the present invention.

FIG. 6A shows an example, 710, of the hierarchy tree 610 of FIG. 5A in which two geometric shapes, 515 and 530, have been selected in order to generate a map of the geometric shapes and their LCA geometric shape, in accordance with an exemplary embodiment of the present invention. In this example, hierarchy program 120 systematically looks at the ancestors of each highlighted node until a common ancestor. The nodes representing the selected geometric shapes have been darkened in hierarchy tree 710 and the edges leading back to the LCA node (node 505) have been made into dashed arrows for clarity. The LCA node 505, which is shown with a bold border, is the lowest common ancestor between nodes 530 and 515. Thus, the lowest ancestor of node 530 is node 506. However, since node 506 is not an ancestor of node 515, hierarchy program 120 analyzes the next lowest ancestor of node 530, which is node 505. Besides being the grandparent of node 530, node 505 is also the parent of node 515. The fact that node 505 is the node that is first common ancestor of nodes 530 and 515 when going backwards makes node 505 the LCA node of nodes 530 and 515. Thus, geometric shape 505 is the LCA geometric shape of geometric shapes 530 and 515.

Figure 6B:
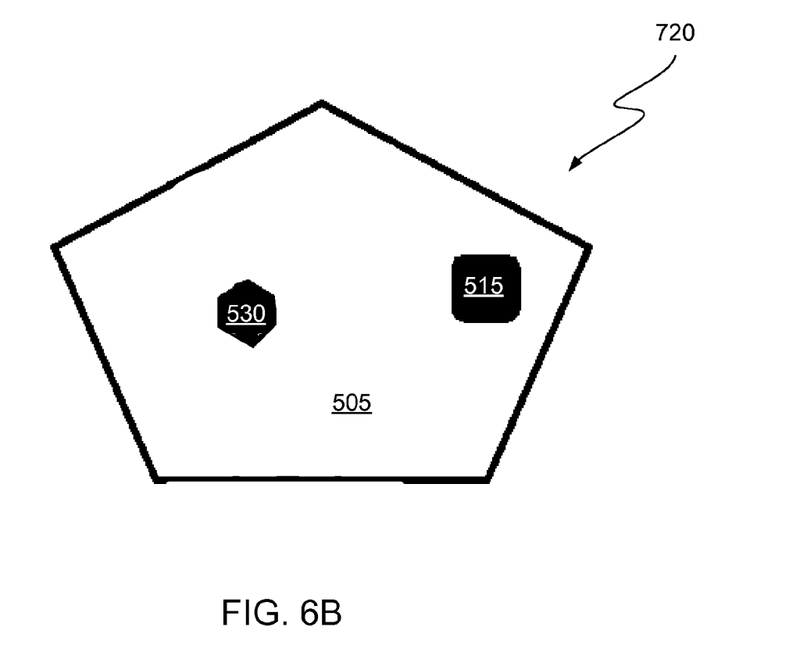
FIG. 6B shows a first example of a map generated by a hierarchy program showing the shapes selected in FIG. 6A and their LCA, in accordance with an exemplary embodiment of the present invention.

FIG. 6B shows a first example of a map, 720, generated by hierarchy program 120 showing the geometric shapes 530 and 515 selected in FIG. 6A and their LCA, geometric shape 505, in accordance with an exemplary embodiment of the present invention. In this example, map 720 only includes the two selected geometric shapes (darkened) and their LCA (not darkened).

Figure 7A:
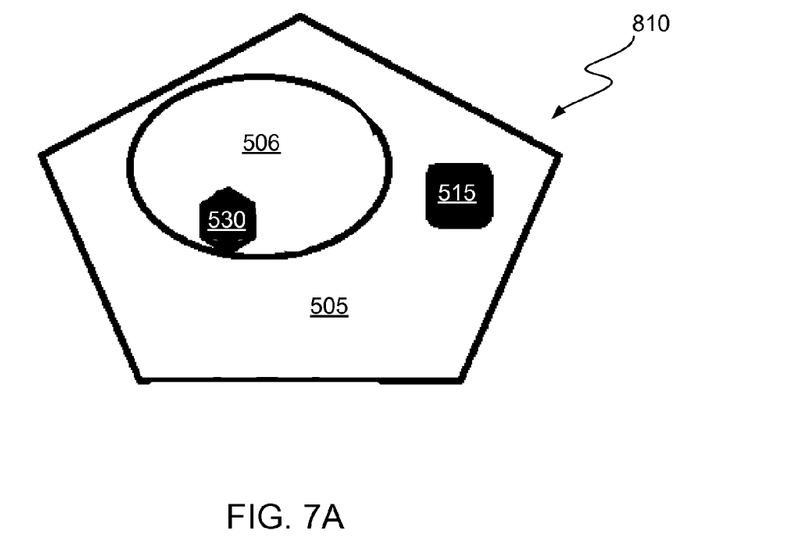
FIG. 7A shows a second example of a map generated by a hierarchy program showing the shapes selected in FIG. 6A, their LCA, and the parent shape of one of the selected shapes, in accordance with an exemplary embodiment of the present invention.
Figure 7B:
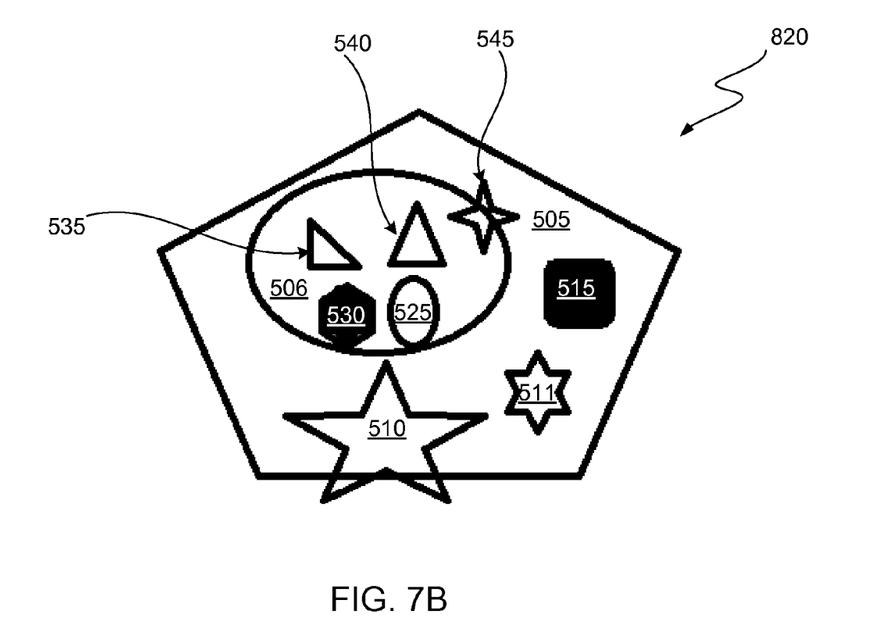
FIG. 7B shows a third example of a map generated by a hierarchy program showing the shapes selected in FIG. 6A, their LCA, and all other children and grandchildren shapes of the LCA, in accordance with an exemplary embodiment of the present invention.

FIGS. 7A and 7B show second and third examples of maps 810 and 820, respectively, which include additional geometric shapes to aid visual context. Map 810 includes the selected geometric shapes 515 and 530 (darkened for highlighting) as well as the LCA geometric shape 505 just like map 720. However, map 810 also includes geometric shape 506, which is the parent geometrical structure of geometrical shape 530. Map 820 includes the selected geometric shapes 515 and 530 (darkened for highlighting) as well as the LCA geometric shape 505 just like map 720. However, map 810 also includes all geometric shapes that are children or grandchildren of geometric shape 505.

Figure 8:
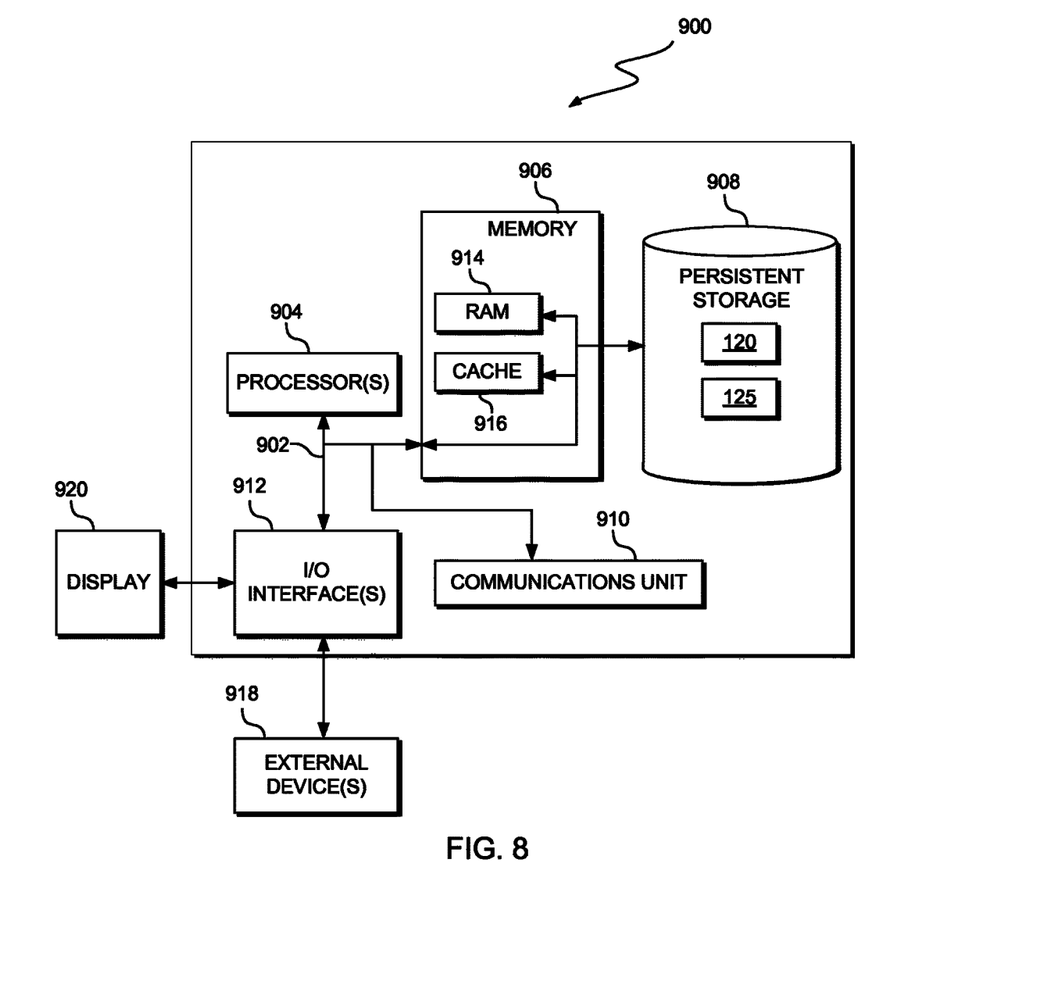
FIG. 8 depicts a block diagram of components of the computing device executing a hierarchy program, in accordance with an exemplary embodiment of the present invention.

FIG. 8 depicts a block diagram, 900, of components of computing device 110, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Computing device 110 includes communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 914 and cache memory 916. In general, memory 906 can include any suitable volatile or non-volatile computer-readable storage media.

Hierarchy program 120 and geometric data 125 are stored in persistent storage 908 for execution and/or access by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 910, in these examples, provides for communications with other data processing systems or devices, including resources of network 130. In these examples, communications unit 910 includes one or more network interface cards. Communications unit 910 may provide communications through the use of either or both physical and wireless communications links. Hierarchy program 120 and geometric data 125 may be downloaded to persistent storage 908 through communications unit 910.

I/O interface(s) 912 allows for input and output of data with other devices that may be connected to computing device 110. For example, I/O interface 912 may provide a connection to external devices 918 such as a keyboard, keypad, a touch screen, and/or some other suitable input device. External devices 918 can also include portable computer-readable storage media such as, for example, thumb drives, portable optical or magnetic disks, and memory cards. Software and data used to practice embodiments of the present invention, e.g., hierarchy program 120 and geometric data 125, can be stored on such portable computer-readable storage media and can be loaded onto persistent storage 908 via I/O interface(s) 912. I/O interface(s) 912 also connect to a display 920.

Display 920 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A computer program product for generating a map display to a user comprising:
    one or more computer-readable storage media and program instructions stored on at least one of the one or more computer-readable storage media, the program instructions comprising:
    program instructions to determine a hierarchy for a plurality of two-dimensional geographical map shapes based on one or more size criteria and whether any two of the plurality of two-dimensional geographical map shapes encapsulate or partially overlap each other, wherein:
        i) a first larger two-dimensional geographical map shape that encapsulates a second smaller two-dimensional geographical map shape is assigned as the parent of the smaller two-dimensional map shape: and
        ii) a second smaller two-dimensional geographical map shape that partially overlaps two or more second larger two-dimensional geographical map shapes is assigned as the child of all of the second two or more larger two-dimensional geographical map shapes or only one of the second two-dimensional geographical map shapes based, at least in part, on a user setting:
    based, at least in part, on the determined hierarchy for the plurality of two-dimensional geographical map shapes, program instructions to generate a hierarchy tree that further includes nodes and edges, wherein the nodes represent each of the plurality of two-dimensional geographical map shapes and the edges represent the relationship between the plurality of two-dimensional geographical map shapes;
    based, at least in part, on the generated hierarchy tree, program instructions to determine a lowest common ancestor (LCA) node between at least two nodes in the generated hierarchy tree by tracing two or more edges associated with the at least two nodes back to the LCA node; and
    based, at least in part, on a determination of the LCA node between the at least two nodes in the generated hierarchy tree, program instructions to generate a map display to the user by including within the map display two-dimensional geographical map shapes that are represented by at least the LCA node and the at least two nodes.

2. The computer program product of claim 1 further comprising:
    program instructions to generate a graph that illustrates the generated hierarchy tree.

3. The computer program product of claim 1 further comprising:
    program instructions to generate a map that includes a set of two or more selected two-dimensional geographical map shapes and a lowest common ancestor two-dimensional geographical map shape of the set of two or more selected two-dimensional geographical map shapes, wherein the map includes a border that encapsulates the LCA node.

4. The computer program product of claim 1, wherein the one or more size criteria is based, at least in part, on areas associated with at least a portion of the plurality of two-dimensional geographical map shapes.

5. The computer program product of claim 1, wherein the two-dimensional geographic map shapes include one or more city shapes, county shapes, state shapes, province shapes, country shapes, continent shapes, hemisphere shapes, and world shapes.

6. A computer system for generating a map display to a user comprising:
- one or more computer processors;
- one or more computer-readable storage media; and
- program instructions stored on at least one of the one or more computer-readable storage media for execution by at least one of the one or more processors, the program instructions comprising:
    - program instructions to determine a hierarchy for a plurality of two-dimensional geographical map shapes based on one or more size criteria and whether any two of the plurality of two-dimensional geographical map shapes encapsulate or partially overlap each other, wherein:
        - i) a first larger two-dimensional geographical map shape that encapsulates a second smaller two-dimensional geographical map shape is assigned as the parent of the smaller two-dimensional map shape; and
        - ii) a second smaller two-dimensional geographical map shape that partially overlaps two or more second larger two-dimensional geographical map shapes is assigned as the child of all of the second two or more larger two-dimensional geographical map shapes or only one of the second two-dimensional geographical map shapes based, at least in part, on a user setting;
    - based, at least in part, on the determined hierarchy for the plurality of two-dimensional geographical map shapes, program instructions to generate a hierarchy tree that further includes nodes and edges, wherein the nodes represent each of the plurality of two-dimensional geographical map shapes and the edges represent the relationship between the plurality of two-dimensional geographical map shapes;
    - based, at least in part, on the generated hierarchy tree, program instructions to determine a lowest common ancestor (LCA) node between at least two nodes in the generated hierarchy tree by tracing two or more edges associated with the at least two nodes back to the LCA node; and
    - based, at least in part, on a determination of the LCA node between the at least two nodes in the generated hierarchy tree, program instructions to generate a map display to the user by including within the map display two-dimensional geographical map shapes that are represented by at least the LCA node and the at least two nodes.

7. The computer system of claim 6 further comprising:
- program instructions to generate a graph that illustrates the generated hierarchy tree.

8. The computer system of claim 6 further comprising:
- program instructions to generate a map that includes a set of two or more selected two-dimensional geographical map shapes and a lowest common ancestor two-dimensional geographical map shape of the set of two or more selected two-dimensional geographical map shapes, wherein the map includes a border that encapsulates the LCA node.

9. The computer system of claim 6, wherein
- the one or more size criteria is based, at least in part, on areas associated with at least a portion of the plurality of two-dimensional geographical map shapes.

10. The computer system of claim 6, wherein the two-dimensional geographic map shapes include one or more city shapes, county shapes, state shapes, province shapes, country shapes, continent shapes, hemisphere shapes, and world shapes.

* * * * *